United States Patent Office 3,234,181
Patented Feb. 8, 1966

3,234,181
MELT-FABRICABLE END-CAPPED AROMATIC POLYIMIDES
Kenneth Leo Olivier, Placentia, Calif., assignor to E. I. du Pont de Nemours and Company, Wilmington, Del., a corporation of Delaware
No Drawing. Filed Mar. 15, 1961, Ser. No. 95,780
11 Claims. (Cl. 260—47)

This invention is concerned with melt-fabricable aromatic polyimides and a process for their preparation. More particularly, this invention is concerned with end-capped aromatic polyimides obtained from the polymerization of certain bis(phenyldicarboxylic anhydrides) and bis(phenylamines) where, in each case, the phenyl groups are connected by divalent bridging groups, this polymerization being carried out in the presence of a critical proportion of a monofunctional, aromatic chain-terminating agent.

Aromatic polyimides exhibiting outstanding physical and chemical properties, including exceptional weatherability, resistance to hydrolysis, high temperature thermal stability, and retention of physical properties at elevated temperatures, are disclosed in U.S. patent application Serial Number 803,347, filed on April 1, 1959, by Walter M. Edwards, now abandoned. These fully aromatic polyimides can be described chemically as high polymers of aromatic tetracarboxylic dianhydrides with primary aromatic diamines.

A preferred process for the preparation of these polyimides is described in U.S. patent application Serial Number 761,968 filed September 19, 1958, now abandoned and in application Serial Number 803,347 (supra), both by Walter M. Edwards. This process involves first preparing a polyamide-acid having an inherent viscosity of at least 0.1, and preferably 0.3–5, by the reaction of the diamine and the dianhydride in an organic polar solvent under suitably anhydrous conditions while maintaining the temperature throughout the reaction below 60° C., and preferably below 50° C., and then converting the polyamide-acid to the polyimide. The structures herein termed "polyamide-acids" may also be termed "polyamic acids."

The polyamide-acid in the form of a shaped object is converted to the polyimide either by a heat treatment alone or by a chemical dehydrating treatment involving heating in the presence of a dehydrating liquid to dehydrate the polyamide-acid groups with the formation of cyclic imide linkages. According to the teachings of Edwards, it is usually necessary to shape the polyamide-acid intermediates rather than the polyimides because the latter exhibit such exceptionally high softening points and such exceptionally high crystalline melting points, and they form such extremely viscous melts that, except in special cases, they cannot be shaped by conventional molding or extruding techniques. Even with the Edwards polyimides prepared from polyamide-acids having lower inherent viscosities (e.g. 0.3) the polyimide may become intractable because the reactive chain ends cause formation of crosslinked or higher molecular weight chains during the heating to convert the polyamide-acid to the polyimide.

Since the conversion of the polyamide-acids to polyimides involves the evolution of a large volume of water in the gaseous phase, the prior art aromatic polyamide-acids must be shaped as very thin-sectioned articles, such as films or fibers, from which water can escape without causing bubbling or distortion. Therefore, heretofore aromatic polyimides usually were fabricated into useful shapes by shaping the polyamide-acid precursor polymer as a very thin-sectioned object. This limitation has greatly restricted the applications of these unique polymers and has prevented attainment of maximum utility from their outstanding physical and chemical properties.

Therefore, it is an object of this invention to provide melt-fabricable aromatic polyimides capable of being shaped while molten by conventional commercial techniques. It is another object of this invention to provide a process for the preparation of melt-fabricable, end-capped aromatic polyimides. It is another object of this invention to provide aromatic polyimides which do not become cross-linked on fusion and which are largely amorphous and non-crystalline and which retain this amorphous, glass-like characteristic during fabrication of articles by injection or compression molding of a melt and during extrusion. It is a particular object of this invention to provide a thermally-stable, viscosity-stable, melt-fabricable, end-capped aromatic polyimide from bis (phenyldicarboxylic anhydrides) polymerized with bis (phenylamines), wherein each case, the phenyl groups are connected by a bridging group in which the bridging atom is selected from the group consisting of carbon, nitrogen, oxygen, silicon, phosphorus and sulphur. It is a particular object of this invention to prepare such an aromatic polyimide from the polymerization of bis(3,4-dicarboxyphenyl) ether dianhydride. It is also a particular object of this invention to provide the aforesaid aromatic polyimide in the form of thick-sectioned articles. Other objects and advantages of this invention will appear hereinafter.

It has now been discovered that the objects and advantages of this invention can be achieved by a process for the preparation of melt-fabricable, aromatic polyimides which comprises the steps of (1) preparing a polyamide-acid solution in a polar, organic solvent by stirring together in the solvent, at 20°–150° C., until the viscosity of the solution reaches a maximum level, a mixture of reactants consisting of the following: (A) a bis(phenyldicarboxylicanhydride); (B) a bis(phenylamine); and (C) an aromatic chain-terminating agent, the proportions of the reactants being from 50 to 42 mole percent of (A), from 42 to 50 mole percent of (B), and from 1 to 8 equivalent percent of (C), said proportion being such that there is a stoichiometric balance of anhydride groups and amine groups in the mixture; (2) precipitating the polyamide-acid by dilution of the solution with a miscible non-solvent for the polyamide-acid; and (3) converting the precipitated polyamide-acid to a granular polyimide having an inherent viscosity in the range of 0.2 to 2.5 when measured in fomal at 35° C. by heating gradually at a concentration of 0.5 g. per 100 ml. of solvent from 50°–325° C. in a stream of inert gas until the evolution of water ceases.

In the above process, the bis(phenyldicarboxylicanhydride) (A) has the structure

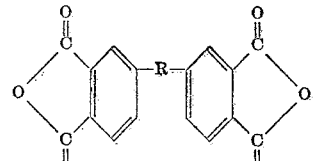

and the bis(phenylamine) (B) has the structure

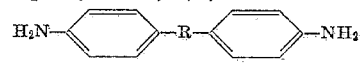

where, in each formula, R is a divalent bridging group in which the bridging atom is selected from carbon, nitrogen, oxygen, silicon, phosphorus, and sulphur. Some examples of such bridging groups are

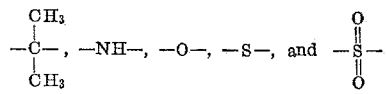

The aromatic chain-terminating agent, hereinafter sometimes termed as end-capping agent (C) employed in the aforementioned process is selected from the group consisting of aromatic primary amines and aromatic dicarboxylic anhydrides. Some examples of the aromatic chain-terminating agents useful in the process of this invention are analine, 4-aminodiphenylether, 4-aminobiphenyl, 4 - amino - 4' - phthalimidodiphenylether, 4 - aminodiphenylamine, 4 - aminodiphenylsulphide, phthalic anhydride, and 3,4-dicarboxydiphenylether anhydride.

Particularly suitable polar organic solvents for use in the process of the subject invention are the N,N-dialkylcarboxylamides of aliphatic carboxylic acids having from one to six carbon atoms in the acid radical. The N,N-dimethylcarboxylamides of this group are particularly useful, and N,N-dimethylacetamide is a preferred solvent because of its ready availability and excellent solvent properties. Other suitable organic polar solvents include tetramethylurea, dimethylsulfoxide, N-methyl-2-pyrrolidone, pyridine, dimethylsulfone, hexamethylphosphoramide, tetramethylenesulfone, dimethyltetramethylenesulfone, and, in general, polar, organic solvents which exhibit a high dipole moment and whose functional groups do not react with the diamines or dianhydrides under the conditions of the polymerization.

In one preferred embodiment of this invention, the bis(phenyldicarboxylic anhydride) employed is bis(3,4-dicarboxyphenyl)ether dianhydride, the bis(phenylamine) is bis(p-aminophenyl)ether and the chain-terminating agent is selected from the group consisting of phthalic anhydride and 4-aminodiphenyl ether.

In the process of this invention, it is preferable to use aromatic end-capping agents, which do not have alkyl substituents in the aromatic ring, since these may be preferential sites for oxidative degradation. It is critically essential to the success of the process of this invention and to the preparation of a melt-fabricable aromatic polyimide that the end-capping agent be added in exactly twice the molar amount to the dianhydride or diamine which it replaces, in order to keep a stoichiometric balance between amine groups and anhydride groups. Otherwise expressed, the end-capping agent must be added in equivalent amount to the difunctional monomer it replaces.

In carrying out the process of this invention, the end-capping agent can be added in proportions of from 1 to 8 equivalent percent, replacing from 1 to 8 mole percent of either the dianhydride or the diamine in the polymer. It is most unexpected in polymer technology to find that such large proportions of chain-terminating reactants can be employed without destroying the toughness and utility of the polymer as a plastic.

It has been found that, in the case of the polyimides, wherever there is an imbalance so that there is an excess of anhydride groups present during the polymerization, either from excess dianhydride or from excess monoanhydride end-capping agent, the resulting polyimide is not melt-stable and becomes embrittled and intractable through cross-linking during fabrication. On the other hand, it has been found that whenever there is an excess of amino groups present, either through the presence of an excess of the diamino monomer or from an excess of the monoamino end-capping agent, the product is subject to rapid degradation on heating during subsequent fabrication as evidenced by the appearance of a dark color. This, too, is unexpected in view of experience with end-capping agents in other polymerization systems.

As a feature of this invention, it has been discovered that a critical criterion for an aromatic polyimide which is readily melt-fabricable by conventional techniques is that the polyimide shall be non-crystalline when formed and shall resist any tendency to crystallize during melt fabrication. As stated hereinabove, such aromatic polyimides have been found to include those having as ingredients bis(phenyldicarboxylic anhydrides) and bis(phenylamines) where, in each case, the phenyl groups are connected by a flexible bridging group or atom such as oxygen, sulphur, sulfone, isopropylidine, etc.

However, it was discovered that such aromatic polyimides, even when prepared as previously known by the use of an excess of either the diamine or the dianhydride to control molecular weight, and especially when made from equal proportions of the dianhydride and the diamine, not only where of too high molecular weight to be melt-fabricated, but were insufficiently stable to molecular weight increase on heating. Therefore, while such materials when initially formed might possibly be compression molded at temperatures well above 400° C. at very high pressures and long molding times, they were not fabricable under practical commercial conditions.

When the attempt was made to decrease the molecular weight in the customary manner by using an excess of an end-capping agent or of one of the difunctional reactants in the polymerizing mixture, the objective was not achieved. Thus, addition to the reaction mixture prior to polymerization of an excess of the tetracarboxylic dianhydride or an excess of an aromatic dicarboxylic anhydride end-capping agent such as phthalic anhydride produced polyimides in which there was evidence of embrittlement due, presumably, to cross-linking reactions occurring as a result of the presence of excess anhydride ends, and the polymers rapidly became intractable and could not be compression molded even under extreme and impracticable conditions. When an attempt was made to control the molecular weight by the addition to polymerization ingredients of an excess of the diamine, or an excess of an aromatic monoamine as end-capping agent, it was found that the polymers became thermally unstable during melt fabrication, rapidly turned very dark, and were degraded by oxidation.

Thus, a critical factor in the subject invention was the discovery that by *replacing* a portion of either the dianhydride or the diamine with an equivalent of a monoanhydride or a monoamine, respectively, melt-fabricable aromatic polyimides of unimpaired physical properties could be prepared. When this procedure was discovered and adopted, polyimides were prepared with controlled molecular weight, as determined by solution viscosity or melt index, and these novel, end-capped aromatic polyimides could be melt-fabricated at temperatures in the range of 270°–350° C., using conventional fabricating techniques such as injection molding and extrusion. These products retain the excellent and exceptional physical properties characteristic of aromatic polyimides, but are far more useful commercially because of their ready fabricability.

For the preparation of high molecular weight polyimides of outstanding properties, it is preferable that all ingredients employed in the process be of high purity to avoid the presence of adventitious impurities which might affect the molecular weight, the color, or the chemical or thermal stability of the resultant polyimides.

The solvent employed for the initial reaction of the aromatic dianhydride with the aromatic diamine must be rigorously refined. Edwards (supra) has disclosed a number of suitable polar organic solvents for the preparation of polyamide-acids. Of these polar organic solvents, it has been found that N,N-dimethylacetamide is particularly suitable for the preparation of the polyimides of the subject invention, and that N,N-dimethylacetamide of suitable purity for the process of this invention can be obtained by distillation from phosphorus pentoxide, passing the condensate through silica gel, and collecting the purified solvent.

For the preparation of aromatic tetracarboxylic dianhydrides of suitable purity, various standard techniques may be employed. One procedure which has been found satisfactory is to prepare the tetramethyl ester of the tetracarboxylic acid. This can be done by suspending the aromatic tetracarboxylic acid in methanol and bubbling through anhydrous hydrogen chloride gas. The resultant tetramethyl ester of the tetracarboxylic acid can then be purified by recrystallization to constant melting point. The purified tetramethyl ester is then saponified to regenerate the tetracarboxylic acid. This saponification is best carried out employing an alcoholic solution of sodium hydroxide, since acidic hydrolysis is rather slow. The purified tetracarboxylic acid is then converted to the dianhydride by recrystallization from anhydrous acetic anhydride, and this dianhydride is then further purified by recrystallization to constant melting point followed by drying under vacuum, and, finally, sublimation.

The purification of the aromatic diamines employed in the subject invention can be achieved by standard processes. One procedure which has been found particularly suitable is to first recrystallize a technical grade aromatic diamine from ethanol. Generally, two recrystallizations should be employed. After drying the product of these recrystallizations in a vacuum, the diamine is finally purified by sublimation through silica gel. Obviously, because of the sensitivity of diamines to oxidation, all operations must be carried out in an inert, anhydrous atmosphere.

Whatever method or methods of purification may be employed with respect to the aromatic tetracarboxylic dianhydride and the aromatic diamine, the best method for ascertaining that sufficient purity has been achieved is to make a test polymerization employing exactly stoichiometric quantities of the respective difunctional monomers. Such a polymerization test is made by weighing out exactly equimolar quantities of the aromatic diamine and of the aromatic dianhydride on an analytical balance maintained in an inert atmosphere. Then a sufficient quantity of purified N,N-dimethylacetamide is added to the mixture of monomeric ingredients to provide an approximately 7% by weight solution. This mixture is stirred at room temperature until the respective monomers have dissolved, and the stirring is continued until the rise in viscosity of the solution substantially stops, indicating the formation of a polyamide-acid of maximum solution viscosity and hence of maximum molecular weight.

Next, the inherent viscosity of the polyamide-acid is determined by diluting an aliquot of the N,N-dimethylacetamide solution with more of this solvent to give a solution having a concentration of 0.5 g./ml. The relative viscosity of this polyamide-acid solution is determined at 35° C., and, from the relative viscosity, the inherent viscosity is calculated. The inherent viscosity is equal to the natural logarithm of the relative viscosity divided by the concentration expressed as grams per 100 ml. of solvent. If the inherent viscosity of the resultant polyamide-acid is found to be in the range of 1.8 to 2.5, the ingredients are sufficiently pure for the preparation of the aromatic polyimides of this invention.

balance of anhydride groups and primary amine groups. The polyamide-acid is prepared in N,N-dimethylacetamide, or other suitable polar organic solvent, following the same procedure described above for the preparation of a stoichiometric polyamide-acid which is not end-capped. However, because the use of an end-capping agent will decrease the solution viscosity of the polyamide-acid, a higher solids content can be employed if desired, preferably in ther ange of 10-15% by weight polyamide-acid in the N,N-dimethylacetamide solvent.

The second step in the procedure is the separation of the polyamide-acid from solution by dilution with a miscible non-solvent for the polyamide-acid. The precipitation of the polyamide-acid from its solution can be achieved with various solvents such as water, benzene, methanol, diethyl ether, petroleum ether, etc. However, a preferred solvent for the precipitation of the polyamide-acid is a mixed solvent of tetrahydrofuran, cyclohexane, and diethyl ether.

The N,N-dimethylacetamide solution is first diluted to twice its original volume by the addition of refined tetrahydrofuran. Then cyclohexane, refined by passage through silica gel, is added, in portions with shaking or stirring, until the incipient precipitation of the polyamide-acid is noted by the appearance of a milky colloidal suspension. This colloidal suspension is then added as a fine stream to an excess of agitated anhydrous ether. While the initially-precipitated polymer (polyamide-acid) may be somewhat sticky, it is converted to a white, fluffy powder after several washings with portions of anhydrous ether in a high speed agitator.

The conversion of the polyamide-acid to the polyimide is achieved by heating in a stream of an inert gas such as nitrogen; preferably, the conversion is carried out stepwise. A typical conversion cycle is as follows: Raise the temperature slowly from room temperature to 100° C. over an interval of two hours; then raise the temperature from 100° to 180° C. over an interval of one hour; hold at 180° C. for a period of one hour; then heat slowly from 180° to 300° C. over an interval of one-half hour; and finally complete the conversion of the polyimide by holding it at 300° to 325° C. in a stream of inert gas for one hour. The converted polyimide is a pale yellow-green in color, and granular.

This novel aromatic polyimide can be shaped by conventional melt fabrication techniques into useful articles having gross cross sections such as sheets, tubing, bars, rods, and the like, or it can be mixed with a filler such as glass fibers and molded into reinforced shaped articles.

A particularly preferred embodiment of the subject invention is found in the preparation of poly-[N,N'-(p,p'-oxydiphenylene)bis(3,4 - dicarboxyphenyl)etherimide]-end-capped with either phthalic anhydride or 4-aminodiphenyl ether. The predominant structure of the resultant polyimide is indicated by the formula

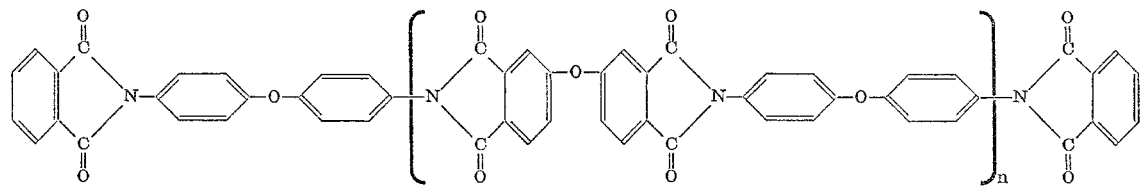

For the preparation of the novel, end-capped, melt-fabricable aromatic polyimides of the subject invention, the first step is similar to that described above for the preparation of a stoichiometric polyamide-acid, except that from 1 to 8 mol percent of one of the monomers is replaced by an equivalent of an appropriate aromatic end-capping agent.

(2 moles of end-capping agent per mole of monomer replaced), either an aromatic carboxylic anhydride or an aromatic primary amine. In either case, the mixture to be polymerized must contain an exactly stoichiometric where the end-capping agent is phthalic anhydride. In this formula, $n$ represents, integers greater than one such that the degree of polymerization provides a polyimide having an inherent viscosity in the range of 0.2 when measured at 35° C. in fomal at a concentration of 0.5 g. per 100 ml. of solvents. This formula is of course indicative of the theoretically perfectly end-capped molecule and does not imply that necessarily in practice every molecule of the polyimide is completely end-capped. Furthermore, it appears from the color of the polyimide and from its infrared spectrum, that occasional imide linkages in the polymer have been isomerized to imino linkages so that occasional structures occur along the hains which can be represented by the following formula:

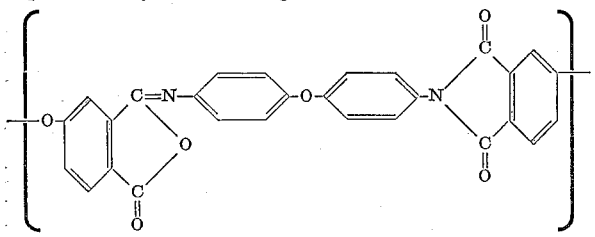

This isomerization is a reversible step characteristic of the imide linkage. The ocurrence of such imino linkages does not, of course, represent any change in the chemical composition of the polymer. In any case, this polymer is hydrolyzable, except for end groups, to a mixture of bis (3,4-dicarboxyphenyl)ether and bis(p-aminophenyl)ether.

On the other hand, if monoaromatic amine end-capping is employed, the structure of the product prepared using 4-aminodiphenyl ether is indicated by the formula

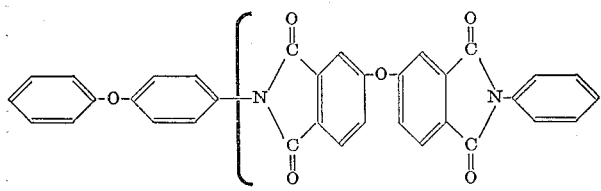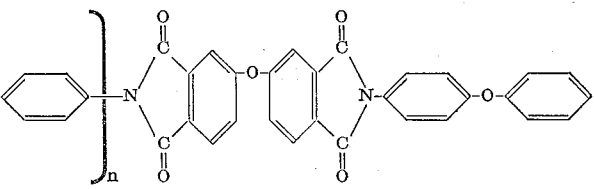

where $n$ represents integers greater than one as indicated above. Again, some of the isomeric imino linkages also may be present according to infra-red analysis.

It will be noted that in either case, the theoretical polymer chain is end-capped with an aromatic ring having no additional reactive group. Thus, in neither case should the polymer molecule be subject to further polymerization by a cross-linking reaction or a chain-coupling reaction.

The dianhydride employed in the preparation of the preferred polyimides described above, bis(3,4-dicarboxyphenyl)ether dianhydride, can be prepared by the reaction of 4-bromo-o-xylene with 3,4-dimethylphenol to yield 3,3′,4,4′ - tetramethyldiphenyl ether. Subsequent oxidation of this compound with potassium permanganate (equivalent amount) is carried out in two steps to give the crude tetracarboxylic acid. The first step of the oxidation is carried out in 50% aqueous pyridine as solvent; subsequently, the pyridine is removed by distillation and the oxidation is completed in 7% aqueous sodium hydroxide solution. The balanced equation for the oxidation requires 8 mols of $KMnO_4$ per mol of bis(3,4-dimethylphenyl)ether.

Next, the tetracarboxylic acid is esterified with methanol by suspending the tetracarboxylic acid in methanol and bubbling through gaseous anhydrous hydrogen chloride, giving as product bis(3,4-dicarbomethoxyphenyl) ether. This tetramethyl ester is purified by recrystallization from a mixed solvent of diethyl ether and cyclohexane. Two recrystallizations of this tetramethyl ester from the mixed solvent give a snow-white crystalline product melting at 75° C.

The purified tetramethyl ester is saponified to regenerate the tetracarboxylic acid by suspension in boiling alcoholic sodium hydroxide and acidification of the resultant sodium salt. The tetracarboxylic acid is converted by dehydration to the dianhydride by recrystallization from acetic anhydride, and the dianhydride is further purified by recrystallization from o-dichlorobenzene followed by drying under a vacuum and sublimation at 230° C. and 0.1 mm. of Hg.

The diamine, bis(p-aminophenyl)ether, is commercially available in the technical grade. It is purified by stirring and heating a suspension in ethyl alcohol (approximately 2 lbs. of diamine is suspended in 2 liters of ethanol for the purification.) This purification is repeated twice, and the purified diamine is thoroughly dried under vacuum and subsequently sublimed through silica gel.

The monofunctional aromatic end-capping agents are purified in a similar fashion. Phthalic anhydride, C.P. grade, is sublimed. 4-aminodiphenyl ether is recrystallized from alcohol and distilled.

The following, with the exception of Example 5, are examples of the preparation of preferred polyimides of the subject invention. These examples are provided to show the best method for the practice of the process of the invention, but it is not intended that the invention be limited thereto since minor modifications in technique would be apparent to anyone skilled in the art. The procedure is similar for preparation of other moldable, end-capped aromatic polyimides of this invention.

*Example 1*

On an analytical balance in a nitrogen-filled dry box were weighed 29.6270 g. (0.0955 mole) of bis(3,4-dicarboxyphenyl)ether dianhydride, 20.0250 g. (0.1000 mole) of bis(p-aminophenyl)ether, and 1.3330 g. (0.0090 mole) of phthalic anhydride. Each of these reagents had been carefully purified as described above. To these materials in a 500-ml. flask there was added 350 ml. of N,N-dimethylacetamide (DMA) (distilled from phosphorus pentoxide and stored under nitrogen). Stirring was carried out at room temperature under nitrogen for three hours to give a clear, colorless, viscous polyamide-acid solution of inherent viscosity 0.64, determined as described above.

Precipitation of the polyamide-acid from solution was effected in the following manner: The solution as prepared above was diluted by the addition of 350 ml. of tetrahydrofuran (redistilled and stored over sodium). Cyclohexane, purified by passage through silica gel, was added portionwise until the solution just became cloudy (approximately 50 ml. added). The resultant cloudy solution was added in a fine stream to well-stirred anhydrous ether in a Waring Blendor. (Note: *A blender equipped with a spark-proof motor should be employed.*) A separate 400-ml. portion of ether was used for each 250 ml. of polyamide-acid solution. The white solid which precipitated was collected by decantation of the solvent mixture and washed three times with 400 ml. portions of anhydrous ether in the Waring Blendor; the product was dried by heating overnight at 130° C. under a stream of nitrogen.

Dehydration of the polyamide-acid to the polyimide was accomplished by heating the polyamide-acid for 2 hours at 130–270° followed by 3 hours at 300° C. under a stream of nitrogen. In this manner, 43 g. (91% yield) of light yellow-green granular polyimide was obtained. The polymer had an inherent viscosity of 0.57 (measured in fomal solution as described below) and a melt index of 0.7 g./10 min. at 350° C. under a force of 11 lbs.

Compression molding at 320° C. gave a light amber transparent bar. Injection molding was carried out by means of a laboratory molding machine at a melt temperature of 370° C. and a mold temperature of 240° C. to give small, transparent, light yellow bars.

*Example 2*

The following carefully-purified reagents were weighed on an analytical balance in a nitrogen-filled dry box; 18.6138 g. (0.06000 mole) of bis(3,4-dicarboxyphenyl) ether dianhydride, 11.5344 g. (0.05760 mole) of bis(p-aminophenyl)ether and 0.8891 g. (0.004800 mole) of 4- aminodiphenylether. To this mixture of reactants there was added 200 ml. of purified N,N-dimethylacetamide. Stirring was carried out for four hours at room temperature to give a clear, colorless, viscous polyamide-acid solution having an inherent viscosity of 0.70.

Precipitation of the polyamide-acid was effected in the following manner: The solution as prepared above was diluted with 200 ml. of purified tetrahydrofuran. To the resulting solution there was added purified cyclohexane in portions until the solution became cloudy (approximately 30 ml. of cyclohexane required). The cloudy solution was then added in a fine stream to well-stirred anhydrous ether in a Waring Blendor (*spark-proof motor*). A separate 400 ml. portion of ether was used for each 220 ml. of solution. The precipitated polymer was washed 3 times with 400 ml. portions of anhydrous ether in the Waring Blendor.

The white polyamide-acid powder was heated under a stream of nitrogen to effect dehydration to the polyimide and to remove residual solvent. The following heating cycle was used: 15 hours (overnight) at 85°, 2 hours at 85–125°, 2 hours at 125–180°, 1 hour at 180°, 2 hours at 180°–300° C. Yield: 25 g. of yellow granular polyimide having inherent viscosity 0.59 (measured in fomal solution at 35° C.). Compression molding at 270° C. and 25,000 p.s.i.g. gave a light yellow, transparent disc.

*Example 3*

On an analytical balance in a nitrogen-filled dry box were weighed the following carefully-purified reagents: 4.0050 g. (0.02000 mole) of bis(p-aminophenyl)ether; 6.1922 g. (0.01996 mole) of bis(3,4-dicarboxyphenyl) ether dianhydride; and 0.0192 g. (0.00008000 mole) of 3,4-dicarboxydiphenyl ether anhydride. To the mixture of reagents there was added 135 ml. of purified N,N-dimethylacetamide. Stirring was carried out for three hours at room temperature to give a clear, colorless, viscous polyamide-acid solution having an inherent viscosity of 1.32.

Precipitation of the polyamide-acid and conversion to the polyimide were effected as described in Example 2 above. This polyimide was molded to yield exceptionally tough bars.

*Example 4*

The following rigorously purified reagents were weighed on an analytical balance in a nitrogen-filled dry box: 6.2046 g. (0.02000 mole) of bis(3,4-dicarboxyphenyl) ether dianhydride; 3,9970 g. (0.01996 mole) of bis(p-aminophenyl)ether; and 0.0264 g. (0.00008000 mole) of 4-amino-4'-phthalimidodiphenyl ether. Purified N,N-dimethylacetamide (135 ml.) was added, and stirring was carried out at room temperature for 3 hours. The clear, colorless, viscous polyamide-acid solution had an inherent viscosity of 1.69.

Precipitation of the polyamide-acid and conversion to the polyimide were carried out as described in Example 2 above. Again, this polyimide could be fabricated by conventional techniques to provide shaped articles of gross cross-section.

*Example 5*

On an analytical balance in a nitrogen-filled dry box were weighed the following carefully purified materials: 10.9065 g. (0.05000 mole) of pyromellitic dianhydride, 9.5119 g. (0.04750 mole) of bis(p-aminophenyl)ether, and 0.9262 g. (0.00500 mole) of 4-aminodiphenyl ether. Purified N,N-dimethylacetamide (150 ml.) was added, and stirring was carried out for three hours at room temperature.

The polyamide-acid solution obtained as above was light yellow-green and had an inherent viscosity of only 0.61. Precipitation and conversion to the polyimide were effected as described in Example 2 above. Unlike the polyimides of the subject invention, this polyimide was a yellow-brown powder which was insoluble in fomal and which could not be compression molded even at 450° C. and 51,000 p.s.i.g.

*Example 6*

The following pure materials were weighed on an analytical balance in a nitrogen-filled dry box: 31.0230 g. (0.1000 mole) of bis(3,4-dicarboxyphenyl)ether dianhydride, 19.3241 g. (0.0965 mole) of bis(p-aminophenyl)ether, and 0.6519 g. (0.0070 mole) of aniline (freshly-distilled from zinc dust). Three hundred and fifty milliliters of N,N-dimethyl acetamide was added, and the mixture was stirred for three hours at room temperature. The resulting clear, colorless polyamide-acid solution had an inherent viscosity of 0.65.

Precipitation of the polyamide-acid and conversion to the polyimide were carried out as described in Example 2 hereinabove. The polyimide obtained weighed 40.5 g. and was yellow-amber in color. It had a melt index of 0.14 g./10 min. and an inherent viscosity of 0.66.

The resin was compression molded at 325° and ca. 8,000 p.s.i. to give an amber bar having an Izod impact strength (notched) of .21 ft.-lb./in.

The polyamide-acids end-caped with aromatic end-capping agents obtained as intermediates in preparation of the polyimides of this invention have maximum stable inherent viscosities in the range of 0.2 to 1.7, but an inherent viscosity of about 0.6 gives a preferred product for many uses. The inherent viscosity is measured in N,N-dimethylacetamide at a concentration of 0.5 gram per 100 ml., at 35° C. This is in contrast to the polyamide-acid intermediates obtained according to the prior art which had inherent viscosities determined under the same conditions in the range of 1.8 to 3.5.

The aromatic polyimides of the subject invention have inherent viscosities in the range of 0.2 to 2.5, determined at 35° C. in fomal at a concentration of 0.5 g./100 ml. Fomal is a mixture of ten parts phenol with seven parts of 2,4,6-trichlorophenol. The aromatic polyimides of the prior art, as described by Edwards (supra) are insoluble in fomal so that their inherent viscosities cannot be determined.

The end-capped aromatic polyimides of the subject invention have melt indices in the range of 0.02 to 7.4, but the preferred products for commercial melt-fabrication operations have melt indices in the range of 0.5 to 1.0. In contrast, the products of the prior art as described by Edwards (supra), always had a melt index of 0 (i.e., they could not be extruded through a melt indexer under the conditions stated hereinbelow).

The melt index is determined at 350° C. under a pressure of 100 p.s.i. (an eleven-pound load applied to a ⅜" diameter cylinder) and the extrudate passes through an orifice 70 mils in diameter with a ¼" land. It is determined as the weight, in grams, of polymer extruded in ten minutes.

The exceptional toughness of the end-capped aromatic polyimides of the subject invention was demonstrated by determination of their impact resistance in a notched Izod impact test. The phthalic anhydride end-capped polyimide of the preferred embodiment of this invention has an Izod impact strength of 0.5 to about 3.5 foot pounds per inch in the melt index range of 3.2 to 0.5, respectively. The 4-aminodiphenyl ether end-capped polyimide of the preferred embodiment of this invention has an Izod impact strength of 1.5 to 0.5 foot pounds per inch in the melt index range below 1.0.

The end-capped polyimides of the preferred embodiment of this invention have a flexural modulus (stiffness in flexure) in the range of 350,000 to 450,000 p.s.i. at room temperature and retain a flexural modulus of about 200,000 to 250,000 p.s.i. at 225° C. This is an indication of their great value in applications requiring the retention of stiffness at elevated temperatures.

Like the intractable aromatic polyimides of the prior art as described by Edwards, the end-capped polyimides of the subject invention are exceptionally resistant to hydrolysis and to weathering as determined by weatherometer test employing unfiltered ultraviolet light.

The end-capped aromatic polyimides of the subject invention show excellent adhesion to metal and to glass fibers, asbestos, and other mineral fillers. This excellent adhesion is retained at high temperatures. This makes them very useful in metal laminates and in reinforced, filled compositions. These end-capped aromatic polyimides have very good electrical properties, making them suitable for insulation, connectors, and the like for use

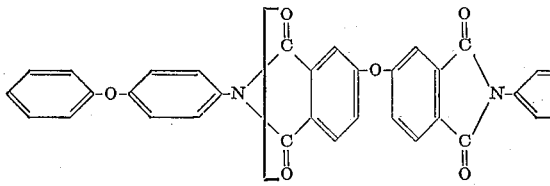

at high temperatures. These novel end-capped aromatic polyimides are self-extinguishing, and hence show excellent fire resistance. In addition, they have been found to be quite resistant to ionizing radiation in that they do not suffer deterioration of electrical or mechanical properties and retain their dimensional stability under heavy radiation dosage with high-energy, ionizing radiations.

As a result of the many remarkable properties found in combination in the novel, end-capped, moldable, aromatic polyimides of the subject invention, these polymers are very useful in forming laminates, such as

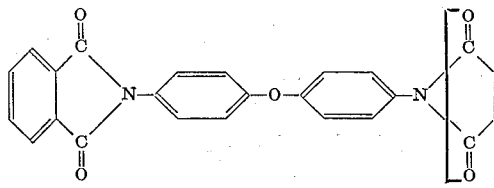

metal laminates, and filled compositions with glass or other inorganic fillers. They have been found to show good ablative properties; therefore, they will be useful in the missile field, particularly in nose cones, either as the pure molded polyimides or as molded, filled compositions. There radiation resistance makes them useful in many fields where atomic energy is involved.

I claim:
1. A melt-fabricable, end-capped aromatic polyimide having the structure

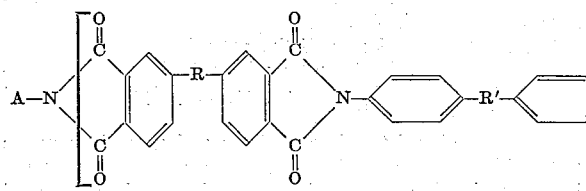

where R and R' are divalent bridging radicals selected from the group consisting of

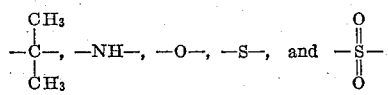

and in which A is an aromatic chain-terminating radical selected from the group consisting of

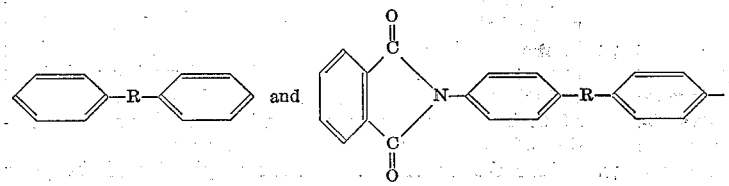

and in which B is an aromatic chain-terminating radical selected from the group consisting of

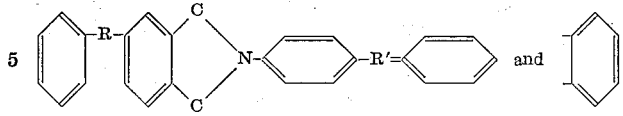

R and R' having the same significance in A and B as set forth above, and $n$ represents a degree of polymerization such that said aromatic polyimide has an inherent viscosity in the range of 0.2 to 2.5 when measured at 35° C. in fomal at a concentration of 0.5 g. per 100 ml.

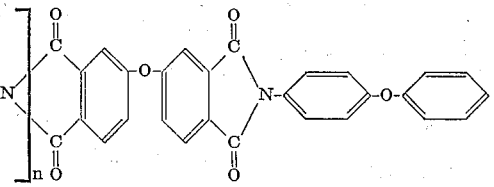

2. A melt-fabricable, end-capped aromatic polyimide having a structure represented by the formula where $n$ represents a degree a polymerization such that said aromatic polyimide has an inherent viscosity in the range of 0.2 to 2.5, when measured at 35° C. in fomal at a concentration of 0.5 g. per 100 ml., and a melt index in the range of 0.02 to 7.5 g. per 10 minutes, measured at 350° C. under a pressure of 100 p.s.i. with a 70-mil, circular orifice die having a 0.25 inch land.

3. A melt-fabricable, end-capped aromatic polyimide having a structure represented by the formula

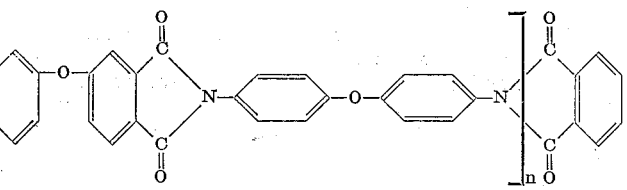

where $n$ represents a degree of polymerization such that said aromatic polyimide has an inherent viscosity in the range of 0.2 to 2.5, when measured at 35° C. in fomal at a concentration of 0.5 g. per 100 ml., and a melt index in the range of 0.02 to 7.5 g. per 10 minutes, measured at 350° C. under a pressure of 100 p.s.i. with a 70-mil, circular orifice die having a 0.25 inch land.

4. A process for the preparation of melt-fabricable, aromatic polyimides in the form of molding granules which consists of the steps of (1) preparing a polyamide-acid solution in a polar, organic solvent by stirring together in the solvent, at 20°–150° C., until the viscosity of the solution reaches a maximum level, a mixture of reactants consisting of the following: (A) a bis(phenyl)tetracarboxylic dianhydride, (B) a bis(phenyl)diamine, and (C) an aromatic chain-terminating agent, the proportions of the reactants being from 50 to 42 mole percent of (A), from 42 to 50 mole percent of (B), and from 1 to 8 equivalent percent of (C), said proportions being such that there is a stoichiometric balance of anhydride groups and amine groups in the mixture; (2) precipitating the polyamide-acid by dilution of the solution with a miscible non-solvent for the polyamide-acid; and (3) converting the precipitated polyamide-acid to a granular polyimide by heating gradually, in a stream of inert gas, from 50° to 325° C. until the evolution of water ceases, and wherein said reactant (A) has the structure

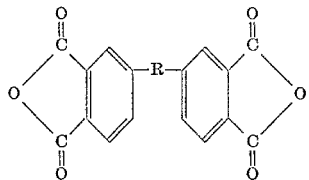

and said reactant (B) has the structure

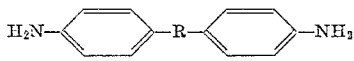

where, in both formulae, R is a divalent bridging radical selected from the group consisting of

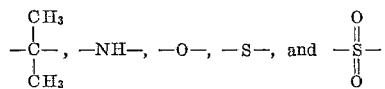

and wherein said aromatic chain-terminating agent, reactant (C), is selected from the group consisting of aromatic primary amines and aromatic dicarboxylic anhydrides.

5. A process according to claim 4 in which the polar, organic solvent is a N,N-dialkylcarboxylamide.

6. A process according to claim 5 in which the N,N-dialkylcarboxylamide is N,N-dimethylacetamide.

7. A process according to claim 4 in which the bis(phenyl)tetracarboxylic dianhydride is bis(3,4-dicarboxyphenyl)ether dianhydride and the bis(phenyl)diamine is bis(p-aminophenyl)ether.

8. A process according to claim 7 in which the aromatic chain-terminating agent is phthalic anhydride.

9. A process according to claim 7 in which the aromatic chain-terminating agent is 4-aminodiphenyl ether.

10. A process according to claim 7 in which the polar, organic solvent is N,N-dimethylacetamide.

11. A process for the preparation of a melt-fabricable, aromatic polyimide which consists of the steps of (1) preparing a polyamide-acid solution in N,N-dimethyl acetamide by stirring together in the solvent, at 20°–150° C. until the inherent viscosity of the polyamide-acid solution is between 0.2 and 1.4, determined at 35° C. at a concentration of 0.5 g./100 ml., a mixture of reactants consisting of bis(3,4-dicarboxyphenyl)ether dianhydride, bis(p-aminophenyl)ether, and an aromatic chain-terminating agent selected from the group consisting of phthalic anhydride, aniline, 4-amino-4′-phthalimidodiphenyl ether, 3,4-dicarboxydiphenyl ether, the proportions of reactants being from 50 to 42 mole percent of the dianhydride, from 42 to 50 mole percent of the diamine, and from 1 to 8 equivalent percent of the aromatic chain-terminating agent, said proportions being such that there is a stoichiometric balance of anhydride groups and amine groups in the mixture; (2) precipitating the polyamide-acid by dilution of the solution with a miscible non-solvent for the polyamide-acid; and (3) converting the precipitated polyamide-acid to a granular polyimide by heating gradually, in a stream of inert gas, from 50° to 325° C. until the evolution of water ceases.

References Cited by the Examiner

UNITED STATES PATENTS

| | | | |
|---|---|---|---|
| 2,731,447 | 1/1956 | Gresham et al. | 260—78 |
| 3,049,518 | 8/1962 | Stephens | 260—78 |
| 3,073,784 | 1/1963 | Endrey | 260—78 |
| 3,073,785 | 1/1963 | Angelo | 260—78 |

FOREIGN PATENTS 570,858 7/1945 Great Britain.

WILLIAM H. SHORT, *Primary Examiner.*

HAROLD N. BURSTEIN, JOSEPH R. LIBERMAN,
*Examiners.*